United States Patent [19]

Guzy

[11] 4,430,472
[45] Feb. 7, 1984

[54] ELASTOMERIC COMPOSITIONS WITH IMPROVED CHEMICAL, WATER AND HEAT RESISTANCE

[75] Inventor: Raymond L. Guzy, Tulsa, Okla.

[73] Assignee: Hughes Tool Company, Houston, Tex.

[21] Appl. No.: 450,692

[22] Filed: Dec. 17, 1982

[51] Int. Cl.³ .............................................. C08K 5/01
[52] U.S. Cl. .................................. 524/483; 524/522; 525/263; 525/265; 525/289; 525/290; 525/301; 525/314; 525/914
[58] Field of Search ............... 525/914, 265, 301, 314, 525/263, 289, 290; 524/483, 522

[56] References Cited

U.S. PATENT DOCUMENTS

| | | | |
|---|---|---|---|
| 2,953,541 | 9/1960 | Pecha et al. | 260/45.5 |
| 3,201,498 | 8/1965 | Brunson et al. | 260/897 |
| 3,236,914 | 2/1966 | Murdock et al. | 260/857 |
| 3,361,850 | 1/1968 | Young et al. | 260/897 |
| 3,636,141 | 1/1972 | O'Neill et al. | 260/880 R |
| 3,737,482 | 6/1973 | Kelly et al. | 260/876 B |
| 3,741,931 | 6/1973 | Martin et al. | 525/263 |
| 3,751,521 | 8/1973 | Roger et al. | 260/876 B |
| 3,793,260 | 2/1974 | Westermann | 525/265 |
| 3,806,490 | 4/1974 | Kajiura et al. | 525/301 |
| 3,806,558 | 4/1974 | Fischer | 260/897 A |
| 3,926,900 | 12/1975 | Guzy et al. | 260/33.6 |
| 3,941,859 | 3/1976 | Batiuk et al. | 260/897 B |
| 4,075,186 | 2/1978 | Ambrose et al. | 525/308 |
| 4,131,654 | 12/1978 | Herman et al. | 260/897 B |
| 4,154,715 | 5/1979 | Kruse | 524/483 |
| 4,268,433 | 5/1981 | Sawatari et al. | 525/263 |

FOREIGN PATENT DOCUMENTS

| | | | |
|---|---|---|---|
| 560682 | 7/1958 | Canada | 525/307 |
| 46-954 | 1/1971 | Japan | 525/301 |
| 46-40422 | 11/1971 | Japan | 525/265 |
| 48-21332 | 6/1973 | Japan | 525/301 |
| 49-29335 | 3/1974 | Japan | 525/308 |
| 55-38809 | 3/1980 | Japan | 525/301 |

OTHER PUBLICATIONS

Derwent Abst. 27998 A/15 (3/1978) Nippon (J53023342).
Derwent Abst. 71524 Y/40 (8/1977) Toyo Soda (J52101241).
Derwent Abst. 05033 E/03 (12-1981) Nippon Oil (J56159238).

*Primary Examiner*—Melvyn I. Marquis
*Attorney, Agent, or Firm*—Robert A. Felsman; Charles D. Gunter, Jr.

[57] ABSTRACT

An elastomeric composition of the type used as a jacketing material for electrical wires and cables is shown having improved chemical, water and heat resistance. An ethylene/acrylic elastomer comprising a terpolymer of ethylene, methyl acrylate, and a cure site monomer is used as the base polymer and has blended therewith a polybutadiene. The polybutadiene has greater than 50% 1,2 polymerized units and has a molecular weight between about 1,500 and 25,000 grams/mole.

2 Claims, No Drawings

ELASTOMERIC COMPOSITIONS WITH IMPROVED CHEMICAL, WATER AND HEAT RESISTANCE

BACKGROUND OF THE INVENTION

The present invention relates generally to elastomeric compositions having improved chemical, water and heat resistance and, specifically, to an elastomeric jacketing composition for use at elevated temperatures and under extreme pressures which can withstand exposure to oil, water and chemical environments such as are found in oil and gas wells.

Wire and cable constructions of the type employed in oil and gas wells, such as the cables running to submerged pumps, must be able to withstand exposures to pressures of 2000 psi or higher and temperatures in excess of 250° F. in contact with crude oil, brines, and hot gases. Various synthetic olefin polymers have been employed in the manufacture of electric wire and cable as jacketing or insulating materials including ethylene-propylene copolymer rubbers and ethylene-propylene-diene monomer terpolymers. These materials ae useful in many applications because of their ease of compounding, good extrudability and excellent electrical characteristics. However, because these materials flow or distort at elevated temperatures and under extreme pressures and are sensitive to swelling and dissolving in various hydrocarbon solvents and oils, their use has been limited to moderate environmental conditions. Where these materials are used in the extreme environmental conditions of oil and gas wells, the materials must generally be chemically modified or protected by added layers of secondary barrier materials, with a resulting increase in manufacturing difficulty and cost.

The ethylene/acrylic elastomers have also been used in the manufacture of electrical wires and cables in the oil and gas industries. The combination of the two major monomers, ethylene and methyl acrylate, in ethylene/acrylic elastomers provides a balance of oil resistance and good heat resistance. Unfortunately, ethylene/acrylic elastomers alone are sensitive to water, aromatic hydrocarbons, and sulfide contaminants such as are often encountered in oil and gas wells.

There exists a need, therefore, for an elastomeric jacketing composition which possesses the heat and oil resistance of an ethylene/acrylic elastomer but which has improved resistance to water, aromatic hydrocarbons, and sulfide contaminants.

There exists a need for such a jacketing composition which can alleviate the need for secondary barrier materials when employed in oil and gas well wire and cable applications and which can be easily compounded and manufactured.

SUMMARY OF THE INVENTION

The present elastomeric compositions having improved chemical, water, and heat resistance comprise an ethylene/acrylic elastomer having blended therewith a polybutadiene having greater than 50% 1, 2 polymerized units and having a molecular weight between about 1,500 and 25,000 grams/mole.

Preferably, the ethylene/acrylic elastomer is a terpolymer of ethylene, methyl acrylate, and a cure site monomer. The preferred ethylene/acrylic elastomer is a normally solid composition which is blended with a normally liquid polybutadiene, the polybutadiene having 65-95%, 1,2 polymerized units and having a molecular weight between about 1,500 and 25,000 grams/mole. The preferred elastomeric composition of the invention has about 70 to 90% by weight of elastomeric composition of an ethylene/acrylic elastomer and 30 to 10 percent by weight of elastomeric composition of normally liquid polybutadiene blended with the ethylene/acrylic elastomer, the polybutadiene having at least 80% 1,2 polymerized units and having a molecular weight between about 1,500 and 25,000 grams/mole.

Additional objects, features and advantages will be apparent in the written description which follows.

DETAILED DESCRIPTION OF THE INVENTION

The base polymer employed in preparing the elastomeric compositions of the present invention are ethylene/acrylic elastomers. The preferred base polymer is an ethylene/acrylic elastomer which is a copolymer of ethylene and methyl acrylate plus a third monomer containing carboxylic curing sites. The preferred ethylene/acrylic elastomer base polymers have the following structural formula:

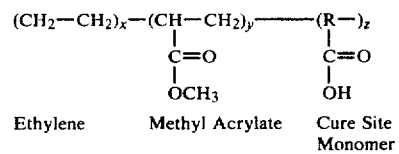

| Ethylene | Methyl Acrylate | Cure Site Monomer |

The methods of preparing ethylene/acrylic elastomers are known and a suitable ethylene/acrylic elastomer which can be used in practicing the present invention is commercially available under the tradename "VAMAC" from the DuPont company. The published product description for VAMAC gives the following properties:

| Polymer Content (Wt %) | 81 |
| Specific Gravity | 1.12 ± 0.03 |
| Mooney Viscosity at 100° C. | 29 ± 5 |
| Physical form, Bale Stud Pack | 25 Kg |
| Color | Black |
| Odor | Mild Acrylic |
| Storage Stability | Excellent |

The liquid 1, 2 polybutadiene which is used in practicing the present invention is characterized as a low molecular weight polymer of butadiene wherein greater than 50% of the monomer units are present in the 1,2 configuration. As is well known, the 1, 3 butadiene monomer may be polymerized by a variety of techniques to give polymers having a high proportion of units having 1, 4 attachment in the cis and trans configuration. Certain commercial techniques based upon anionic polymerization technology are also well known whereby the 1,2 butadiene monomer may be polymerized to give polymers having a high proportion 1,2 attachment, viz:

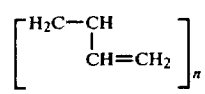

Such polymers can be produced in a variety of molecular weight ranges and with varying proportions of 1,2 to 1,4 units. For the purposes of this invention, only those materials having molecular weights low enough to be liquid or semi-solid, when at room temperature and solvent free, and containing not less than 50 mole percent units having 1,2 attachment, the remaining fraction being units with 1,4 attachment are useful. While the molecular weight of these materials may vary somewhat depending on the proportion of 1,2 and 1,4 attachments and remain liquid, it has been found that the most desirable materials have molecular weights in the range of about 1,500 to 25,000 grams/mole. Although called liquid resins, many of these materials are extremely viscous having viscosities in excess of 10,000 cps at room temperature, becoming truly pourable only when heated.

The level of liquid polybutadiene employed in the blend of the elastomeric compositions of the invention is preferably between about 10 to 30 parts per hundred parts ethylene/acrylic elastomer. The preferred range of liquid polybutadiene used is between about 15 and 25 parts per hundred parts ethylene/acrylic elastomer with the most preferred amount being about 20 parts per hundred polybutadiene. While lesser amounts of liquid polybutadiene may be employed where exposure to extreme conditions is not contemplated, blends containing as little as 10 parts polybutadiene per hundred parts ethylene/acrylic elastomer are considered to be too sensitive to hot oil, water and other contaminants found in the oil and gas well environment. The flexibility of the resulting blend is greatly affected by increased levels of polybutadiene and it has been found that blends containing greater than about 25 to 30 parts liquid polybutadiene per hundred parts ethylene/acrylic elastomer are too rigid, hard, and inflexible when cured to be used as wire and cable insulating materials.

A suitable curing agent or agents must be provided to effect the necessary curing and cross-linking of the compounded material. The higher temperature peroxides such as dicumyl peroxide and α, α', bis (t-butyl-peroxy)-di isopropyl benzene are well suited for the practice of the present invention in accomplishing a rapid and complete cure. The amount of peroxide curing agent employed can vary between about 7 to 14 parts per hundred parts ethylene/acrylic elastomer with the most preferred amount being about 10 parts per hundred peroxide based on the weight of the total blend. Very low levels of curing agents are undesirable since the degree of cross-linking affects solvent and environmental resistance of the cured compound. Higher levels of cross-links result in higher cure and consequently a more rigid inflexible material which is undesirable for use as wire and cable insulation.

The blending of the ethylene/acrylic elastomer and the liquid polybutadiene resin can be accomplished by any of the common rubber compounding methods including roll milling and the like. Additional materials including the curing agents, lubricants, fillers, antioxidants and carbon blacks commonly employed in the electrical insulating resins may also be added, either at this point or during a later compounding step. A phenolic filler material supplied commercially under the tradename "DUREZ 12687" by the Durez Division, Hooker Chemical Corporation has been found to be especially useful. DUREZ 12687 is a phenolic resin containing 8% hexamethylenetetramine which is commonly used in rubber compounding and which cures rapidly to a hard, inflexible, heat resisting product which is insoluble in oils, acids, alkalies, and organic solvents. The range of phenolic filler used in the present blend is between about 20 to 90 parts phenolic filler per hundred parts ethylene/acrylic elastomer. The preferred range of phenolic filler is between about 30 to 60 parts with the most preferred amount of phenolic filler being about 50 parts phenolic filler per hundred parts of ethylene/acrylic elastomer.

EXAMPLES

The invention will be more fully understood by reference to the following examples, wherein all ingredients are given in parts per hundred parts ethylene/acrylic elastomer. Note that 124 parts of VAMAC are used since VAMAC contains approximately 81% active polymer. That is, 124 (0.81) equals approximately 100 parts ethylene/acrylic elastomer as the base reference. There are then, for instance, 20 parts of 1,2 liquid polybutadiene used per hundred parts of ethylene/acrylic elastomer.

In order to demonstrate the improved properties of the elastomeric jacketing compositions of the invention, a sample blend composition was formulated by compounding on a two roll mill, cured in slab form having about a 0.070 inch thickness by heating at 400° F. for 10 minutes in a press, cut into 1½ inch by ¾ inch strips and tested. The environmental test consisted of placing the sample to be treated into a pressure vessel containing a selected test fluid, pressurizing the vessel with nitrogen and heating while maintaining the pressure at 4000 psi. After 7 days, at the testing temperature, the vessel was cooled to room temperature, the pressure was released, and the sample removed. The final weight and dimensions of each sample was measured and the % change recorded.

The sample formulation of the improved composition of the invention was:

|  | Parts |
|---|---|
| Ethylene/acrylic elastomer (VAMAC 124')[1] | 124 |
| 1,2 Liquid Polybutadiene (RICON 154)[2] | 20 |
| Carbon Black Reinforcing Filler (N337)[3] | 30 |
| Dicumyl Peroxide Curing Agent (Di Cup R)[4] | 11 |
| Processing Lubricant (VAN FRE AP-2)[5] | 2 |
| Diak #1[6] Curing Agent (hexamethylene diamine carbamate) | 1 |
| DPG[7] (diphenyl-guanidine accelerator) | 4 |
| Lubricant (Armeen 18D)[8] | 0.5 |
| Stearic Acid Processing Aid[9] | 1 |
| DUREZ 12681 Phenolic Filler | 50 |

[1]DuPont
[2]Colorado Chemical Specialities, Inc.
[3]Continental Carbon
[4]Hercules, Process Chemicals Division
[5]RT Vanderbilt
[6]DuPont
[7]Monsanto Chemical Co.
[8]Armak, Industrial Chemicals Division
[9]Darling
[10]Hooker Chemical Company

TABLE I

| VAMAC | (275° F.) | Tensile Strength (psi) | % Elongation | Durometer (Shore "A") | % Volume Change |
|---|---|---|---|---|---|
| original |  | 2280 | 360 | 78 |  |
| water | 1 month | 1710 | 200 | 77 | 9.5 |
|  | 3 months | 1090 | 10 | 93 | 6.4 |
| Freezene (Mineral Oil) | 1 month | 2370 | 90 | 82 | 6.8 |
|  | 3 months | 2180 | 60 | 89 | 8.0 |
| Sulfide | 7 days | 1870 | 240 | 69 | 94.4 |

TABLE I-continued

| VAMAC | (275° F.) | Tensile Strength (psi) | % Elongation | Durometer (Shore "A") | % Volume Charge |
|---|---|---|---|---|---|
| Xylene | 4 hours | | | | 222 |
| | 8 hours | | | | 239 |
| | 24 hours | | | | 245 |

TABLE II

| SAMPLE Composition | | Tensile Strength (psi) | % Elongation | Durometer | % Volume Charge |
|---|---|---|---|---|---|
| original | | 2490 | 130 | 88 | |
| water (10% brine) | 7 days at 450° F. | 4450 | 20 | 94 | 4.8 |
| Freezene (Mineral Oil) | 7 days at 350° F. | 1960 | 80 | 78 | 15.6 |
| Sulfide | 7 days at 275° F. | 2340 | 80 | 85 | 17.7 |
| Xylene | 24 hours at 275° F. | | | | 121.9 |

As seen from the test results the Sample Composition of the invention containing a blend of ethylene/acrylic elastomer and 1,2 polybutadiene showed a 20% elongation after 7 days in water at 450° F. indicating that the composition would remain flexible when exposed to water. The example composition also displayed greatly reduced swelling in water (9.5% to −4.8%) and in the presence of sulfide contamination (94.4% to 17.7%). The tendency to swell in the presence of xylenes was reduced from 245% to 121.9%.

The foregoing examples have been provided by way of illustration, thereby demonstrating jacketing materials resistant to destruction by exposure to oil, water, and sulfides under high pressure and at elevated temperatures. The improved elastomeric jacketing compositions of the invention are suitable for use as jacketing and cushioning materials in wires and cables used in oil and gas wells. The improved material is also useful as an O-ring material and in elastomeric bags and seals of the type used in downhole pumps and apparatus for use in oil and gas wells.

While the invention has been shown in only one of its forms, it should be understood that it is not thus limited but is susceptible to various changes and modifications without departing from the spirit thereof.

What is claimed is:

1. In a process of producing a curable elastomeric jacketing composition having improved chemical and heat resistance when cured from an ethylene/acrylic elastomer which is a copolymer of ethylene and methyl acrylate plus a cure site monomer and which has a polymer content of approximately 81% by weight, a specific gravity of 1.12±0.03 and a Mooney Viscosity at 100° of 29±5, the improvement comprising:
   the step of blending said ethylene/acrylic elastomer with a polybutadiene having greater than 50% 1,2 polymerized units and having a molecular weight between 1,500 and 25,000 grams/mole.

2. The process of claim 1, wherein polybutadiene is a normally liquid polybutadiene having greater than 80% 1,2 polymerized units and having a molecular weight between 1,500 and 25,000 grams/mole.

* * * * *